United States Patent [19]
Lilley

[11] Patent Number: 5,865,590
[45] Date of Patent: Feb. 2, 1999

[54] DUAL PIVOT MATERIAL HANDLER

[75] Inventor: Mark W. Lilley, Scarborough, Me.

[73] Assignee: Southworth Products Corp., Portland, Me.

[21] Appl. No.: 780,818

[22] Filed: Jan. 9, 1997

[51] Int. Cl.[6] .................................................. B65G 65/23
[52] U.S. Cl. .......................................... 414/420; 414/421
[58] Field of Search .................................. 414/420, 421, 414/425, 778

[56] References Cited

U.S. PATENT DOCUMENTS

| | | | |
|---|---|---|---|
| 2,851,178 | 9/1958 | Rea et al. ................................. | 414/420 |
| 3,342,358 | 9/1967 | French et al. ........................ | 414/408 X |
| 4,095,708 | 6/1978 | Gerhard .................................. | 414/420 |
| 4,122,961 | 10/1978 | Kress ...................................... | 414/420 |
| 4,447,185 | 5/1984 | Robinson et al. ...................... | 414/420 |
| 4,946,331 | 8/1990 | Johnson .............................. | 414/425 X |
| 4,989,917 | 2/1991 | Schmidt, Jr. ......................... | 414/421 X |
| 5,006,039 | 4/1991 | Niederer .............................. | 414/421 X |
| 5,538,389 | 7/1996 | Stone ...................................... | 414/778 |

FOREIGN PATENT DOCUMENTS

| | | | |
|---|---|---|---|
| 0412043 | 2/1991 | European Pat. Off. ................ | 414/420 |
| 1057391 | 11/1983 | U.S.S.R. ................................. | 414/420 |

OTHER PUBLICATIONS

Kippcon, "Tipping and Handling Unit" brochure, Jan. 1980.
2–page brochure "Material Handling Dumpers & Tippers—SPI Lift" SP Industries, Inc., 2982 Jefferson Rd. Hopkins, MI 49328.

Primary Examiner—James W. Keenan
Attorney, Agent, or Firm—Kenway & Crowley

[57] ABSTRACT

A dual pivot material handler including a base section, a container, a pivot frame, a hydraulic power unit, a hydraulic control unit, and hydraulic cylinders for rotating the container about two pivot points. The container is pivotably mounted to one end of the pivot frame at a container pivot point, and a second end of the pivot frame is pivotably mounted to the base section at a base section pivot point. To rotate the container about the container and base section pivot points, hydraulic cylinders are mounted between the pivot frame and the container and between the base section and the pivot frame. At the initiation of a dump cycle, the cylinders mounted between the pivot frame and the container are actuated to rotate the container about the container pivot point to a horizontal position. In the horizontal position, the container rests on the pivot frame. Next, the cylinders mounted between the pivot frame and the base section are actuated to rotate the pivot frame, with the container resting thereon, about the base section pivot point to a full dump position.

3 Claims, 10 Drawing Sheets

DUAL PIVOT MATERIAL HANDLER

FIELD OF THE INVENTION

The present invention relates in general to material handlers or dumpers, and, in particular, to a material handler having a dual pivot design.

BACKGROUND OF THE INVENTION

Material handlers or dumpers are used in a wide variety of industrial applications to enable efficient sorting, organization, and transportation of large volumes of bulky materials. Material handlers automatically elevate and dump such materials, allowing products to flow from containers at controlled rates to predetermined locations. For example, material handlers are used in the automobile manufacturing process to assist employees in sorting and organizing parts, and in postal applications for delivering mail from large containers onto conveyers for sorting.

Depending on the intended application, the handler may be designed in a variety of shapes and sizes for handling either solids or liquids. In addition, a handler may be designed as either a stationary or mobile unit. One particular feature of a handler which is important in many applications, however, is the container dump height variation. The term "dump height variation" refers to the change in vertical height of the lip of the container when the container is moved by the handler from a horizontal position to a "full dump position". It is well understood that container dump height variation directly affects the controllability of a dumping operation. In handlers that produce large container dump height variations, the dumping process is difficult for an operator to control, and materials tend to flow out of the container in uneven amounts in the dumping cycle. Thus, a goal in the design of material handlers is to minimize container dump height variation.

Compactness of motion of the container is another important feature of a material handler. The height and space available to operate the handler is usually limited. Thus, a material handler preferably has a compact motion resulting in efficient use of industrial space and improved controllability.

To date, prior art material handlers have failed to fully minimize dump height variation and container motion in a simple and cost-effective design.

OBJECTS OF THE INVENTION

Thus, a primary object of the present invention is to provide a material handler which allows for improved controllability of a dumping process.

Another object of the present invention is to provide a material handler which produces a minimal container dump height variation in a compact motion.

A further object of the invention is to provide a material handler having a simple design, allowing for ease of manufacture and repair.

A still further object of the present invention is to reduce the cost and improve the efficiency of processes which utilize material handlers.

These and other objects of the present invention will become apparent from a review of the description provided below.

SUMMARY OF THE INVENTION

The present invention is organized about the concept of providing a material handler having a compact motion and minimized container dump height. Advantageously, the design incorporates only direct acting hydraulic cylinders with no additional cams, linkage, etc.

The material handler of the present invention is a dual pivot handler including a base section, a container, a pivot frame, a hydraulic power unit, a hydraulic control unit, and hydraulic cylinders for rotating the container about two pivot points. The pivot frame is preferably a tubular steel construction having triangular end members spaced by perpendicular supports. A pair of clevis plates mounted to the container are received within a pair of pivot frame container clevises mounted at one end of the pivot frame to pivotably mount the container to the pivot frame at a container pivot point. A pair of hydraulic tilt cylinders are mounted between the pivot frame and the container to rotate the container about the container pivot point.

A base section pivot point is established between the pivot frame and the base section. A pair of clevis plates at a second end of the pivot frame are received within a pair of base section clevises to pivotably mount the second end of the pivot frame to the base section. A pair of hydraulic dump cylinders are mounted between the pivot frame and the base section to rotate the container about the base section pivot point.

The operator controls the dump cycle through the hydraulic control unit which is electrically connected to the hydraulic power unit. At the initiation of a dump cycle, the tilt cylinders are actuated to rotate the container about the container pivot point approximately 90° to a horizontal position. In the horizontal position, the container rests on the pivot frame. Next, the dump cylinders are actuated to rotate the pivot frame, with the container resting thereon, about the base section pivot point. The dump cylinders rotate the container approximately 50° relative to the horizontal position to a full dump position.

BRIEF DESCRIPTION OF THE DRAWING

For a better understanding of the present invention, together with other objects, features and advantages, reference should be made to the following description of the preferred embodiment which should be read in conjunction with the following figures wherein like numerals represent like parts.

DETAILED DESCRIPTION OF THE PREFERRED EMBODIMENTS

Figure 1:
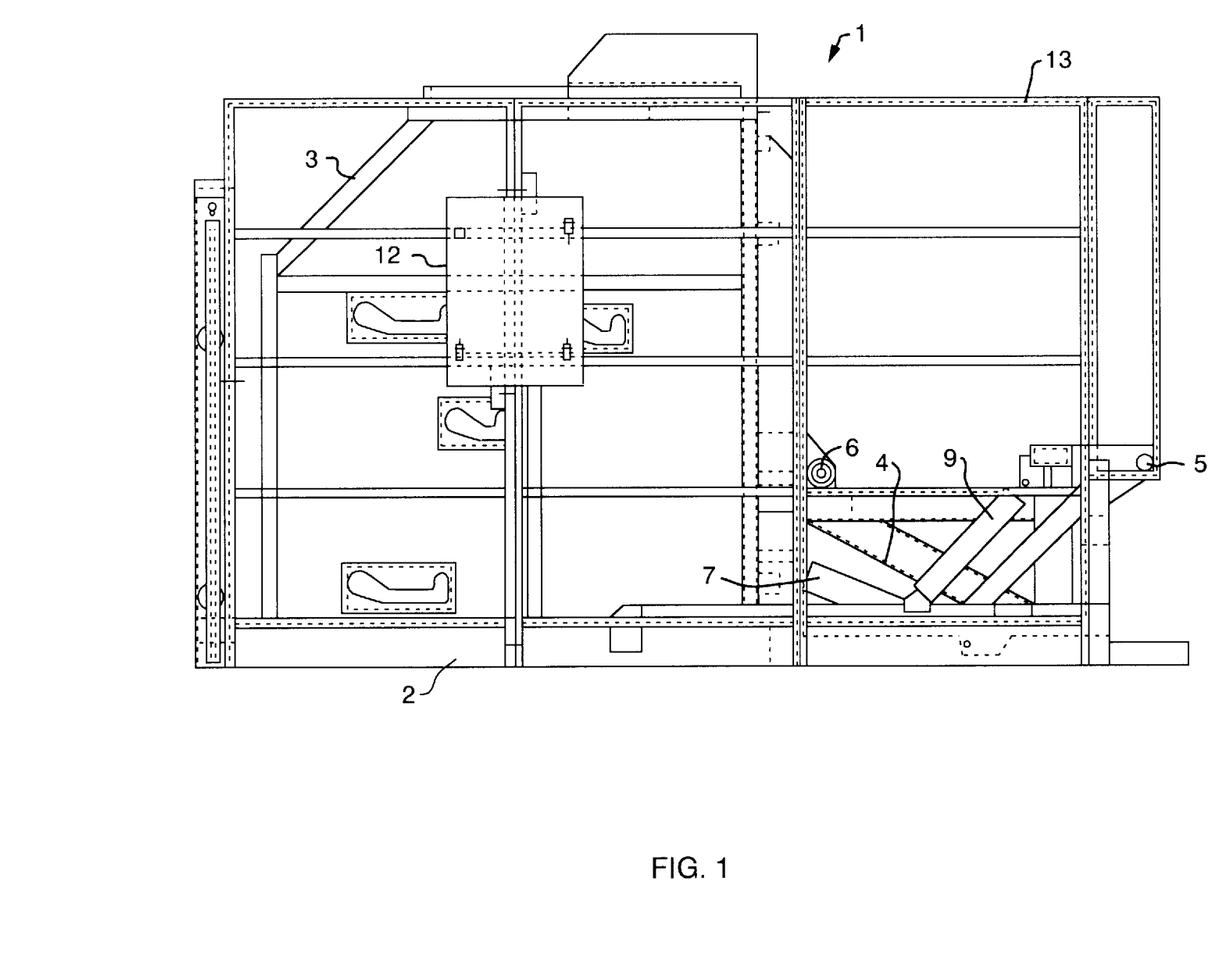
FIG. 1: is a side plan view of a material handler according to the present invention.

Referring to FIG. 1 of the drawing, there is shown a preferred material handler 1 according to the present invention. As shown, the material handler includes a stationary base section 2 with a pivot frame 4 pivotably mounted thereto at a base section pivot point 5. A material container 3 is pivotably mounted to the pivot frame at a container pivot point 6. As shown particularly FIG. 8, to lift and dump the container 3, hydraulic tilt pistons 7,8 and dump pistons 9,10, are actuated in a controlled fashion by a hydraulic power unit 11. The hydraulic power unit 11 is operator-controlled by an external hydraulic control unit 12 mounted in a convenient location. As shown in FIG. 1, the hydraulic control unit 12 may be mounted on an optional side panel guard 13 which protects against injury from moving parts.

Figure 2:
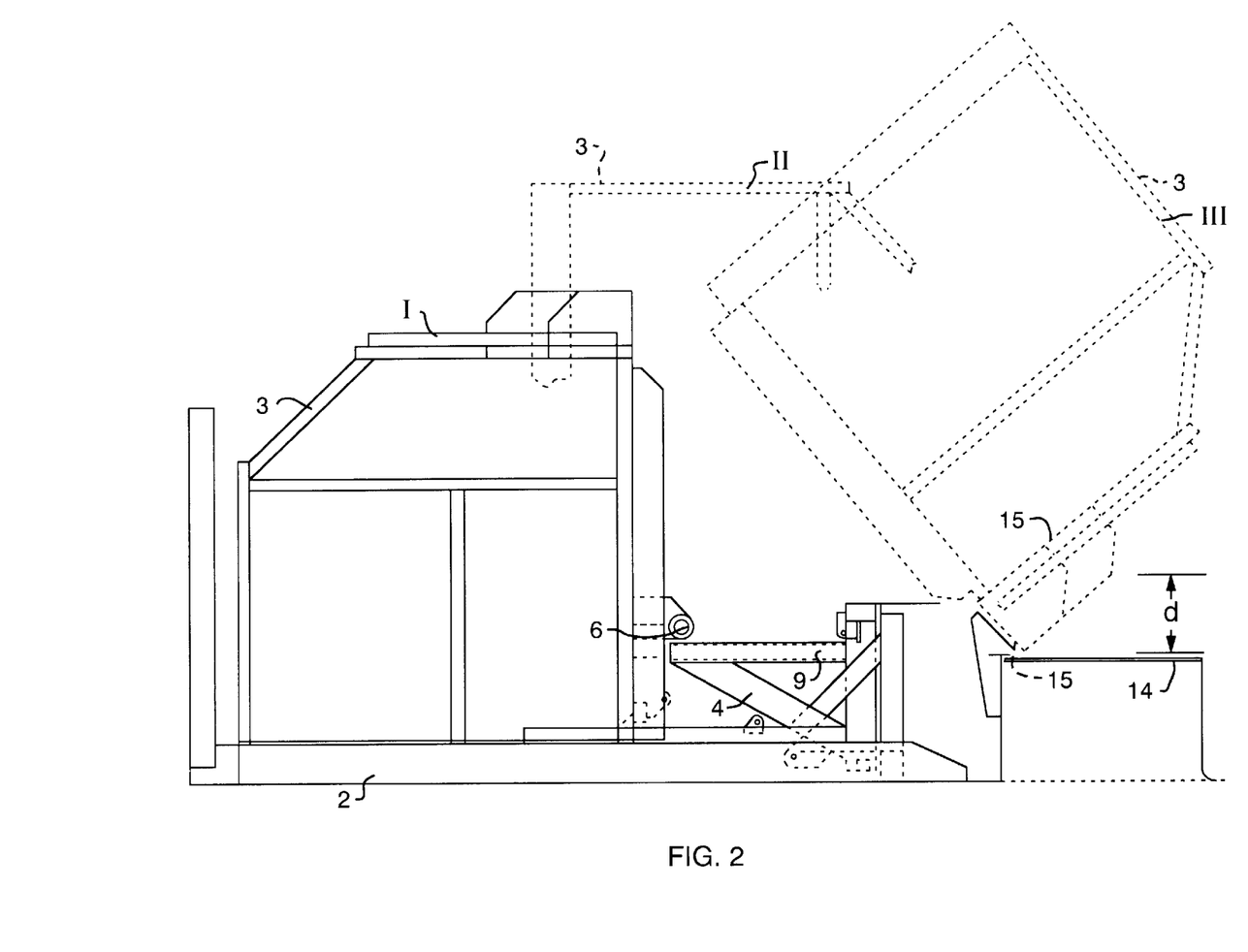
FIG. 2: is a side view showing consecutive relative positions of a container, a pivot frame, and a base section during the dumping motion of a preferred material handler according to the present invention.

Referring now to FIG. 2, the operation of the material handler 1 will now be described generally with a more detailed description to follow. In FIG. 2, the container 3 is shown in three positions of the dumping motion; a home position I, a horizontal position II, and a full dump position III. At the start of a dump cycle, the container 3 is rotated about the container pivot point 6 by the tilt cylinders 7,8 (FIGS. 7–9) connected between container 3 and the pivot frame 4. Rotation of the container 3 about the pivot point 6 moves the container from the home position I to the horizontal position II where the container is supported by the pivot frame 4 horizontally relative to the base section 2.

Dump cylinders 9, 10 (FIGS. 7–9), extending between the base 2 section and the pivot frame 4, rotate the pivot frame 4 about the base section pivot point 5 to move the container 3 from the horizontal position II to the full dump position III. In the full dump position III, the container is rotated approximately 50° relative to the horizontal position. The transition from the horizontal position to the full dump position may be operator-controlled through the hydraulic control unit 12 to control the flow of materials from the container to a predetermined location, e.g. onto a conveyor 14.

The material handler of the present invention is thus a "dual pivot" design having a first pivot at the base section pivot point 6 and a second pivot at the container pivot point 5. Advantageously, rotation of the container from the home position I to the horizontal position II, and then to the full dump position III, minimizes the vertical lift of the container resulting in a compact dumping motion. Also, the dump height variation d of the container lip 15 from the horizontal to the full dump position is minimized. For example, in the preferred embodiment the container dump height variation d is 13", compared to a typical 30" variation in prior art "single pivot" dumpers. These significant advantages are achieved in a simple design using direct acting hydraulic cylinders with no additional cams, linkage, etc.

Figure 3:
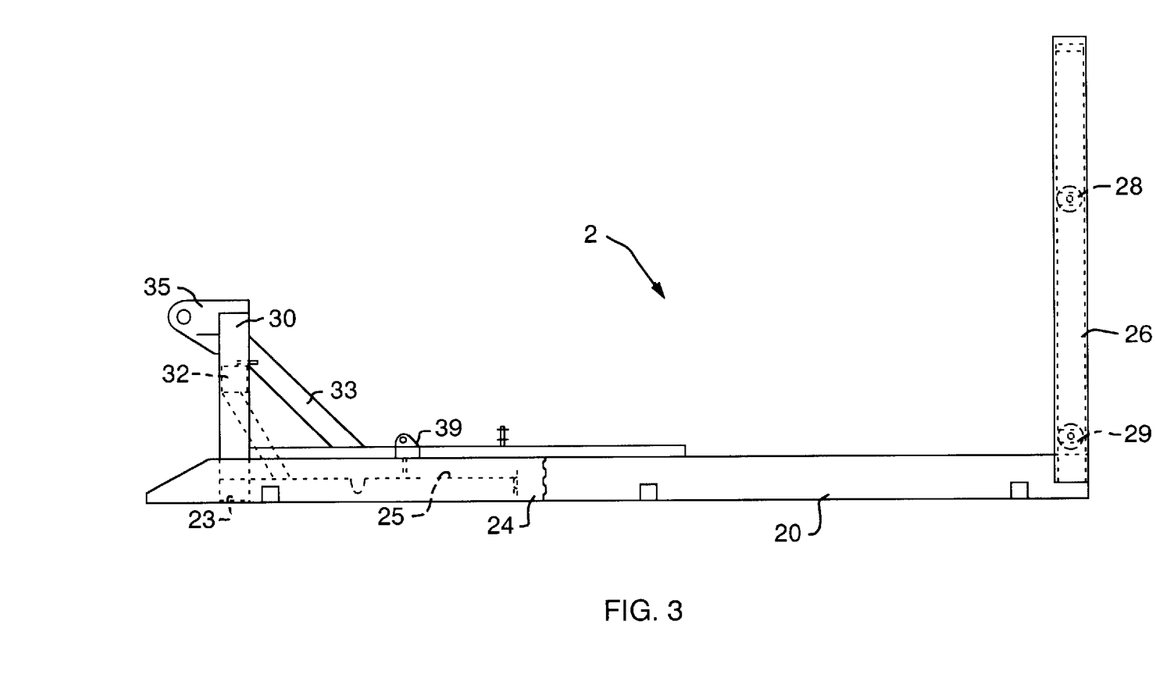
FIG. 3: is a side view of a base section of a material handler according to the present invention.
Figure 4:
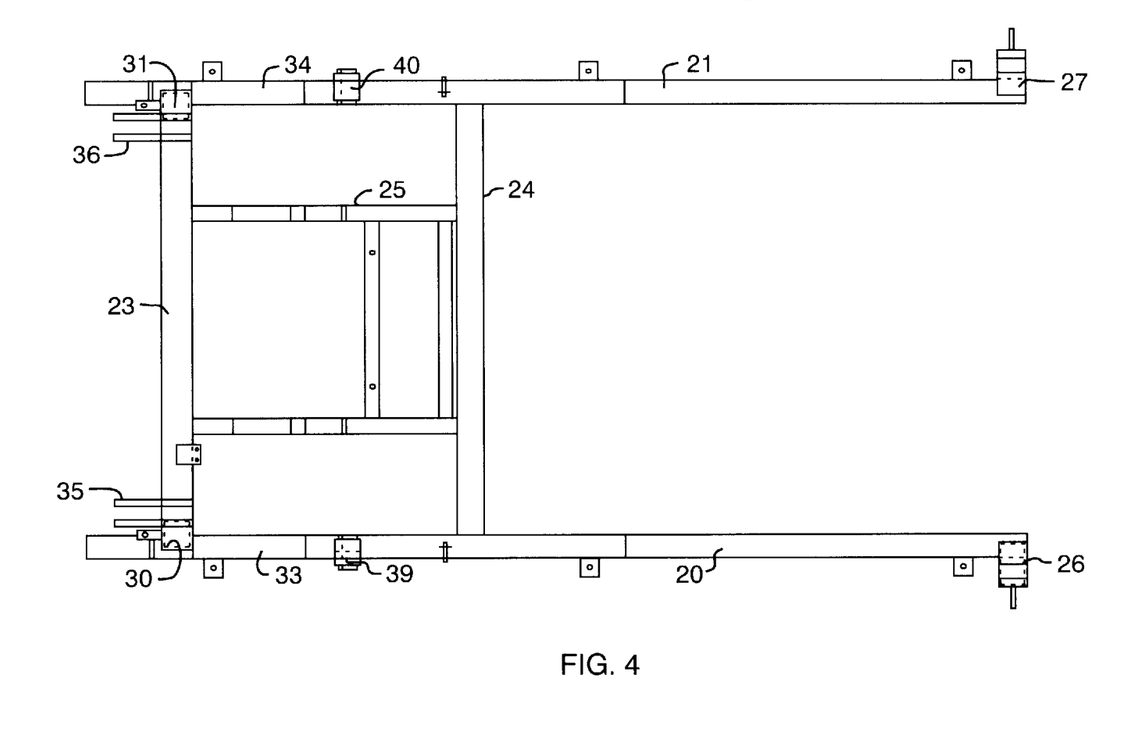
FIG. 4: is a top view of the base section shown in FIG. 3.

A preferred base section 2 for a material handler according to the present invention is shown in FIGS. 3 and 4. The base section is a tubular steel construction having parallel base rails 20, 21 spaced by two perpendicular members 23, 24. Between the perpendicular members is a support frame 25 for mounting the hydraulic power unit and providing structural support. Vertically extending retainer bars 26, 27 extend from a first end of each of the base rails. The retainer bars are provided for mounting the optional side guard 13 and photoelectric sensors 28, 29 for disabling power to the system when an operator or equipment are in the area of the loading end of the container.

Figure 6:
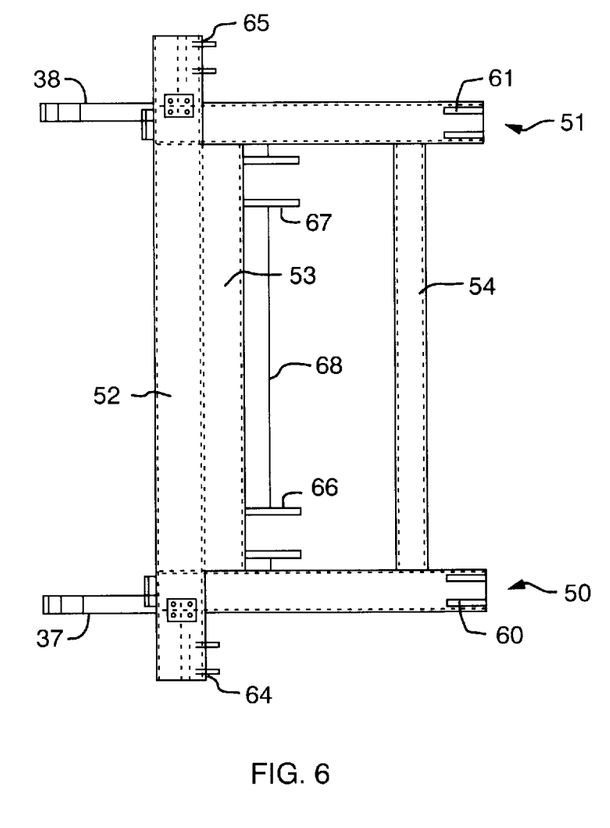
FIG. 6: is a top view of the pivot frame shown in FIG. 5.

A pair of vertical pivot frame support members 30, 31 extend from the base rails. The pivot frame support members are spaced by the perpendicular member 23 and an additional perpendicular member 32. Horizontal supports 33, 34 extend from the vertical support members to the base rails. A pivot frame clevis 35, 36 extends from each of the vertical pivot frame support members for pivotably mounting the pivot frame to the base section through pivot frame clevis plates 37, 38 (FIG. 6). Base section dump cylinder devises 39, 40 are mounted to each base rail to provide a secure base section mounting position for the dump cylinders 9, 10.

Figure 5:
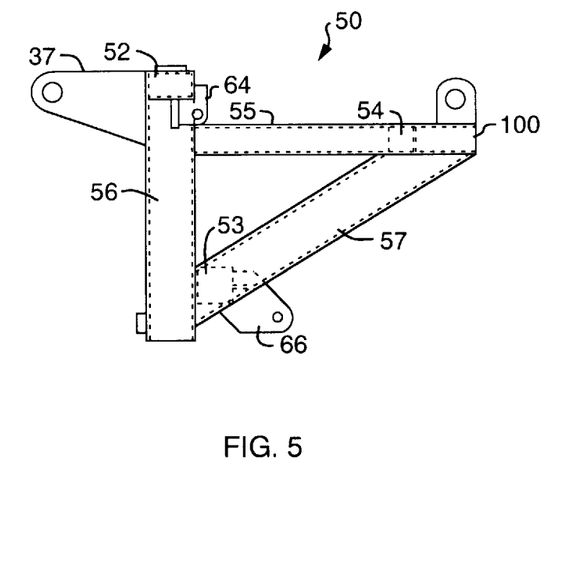
FIG. 5: is a side view of a pivot frame of a material handler according to the present invention.

A preferred pivot frame 4 according to the present invention is shown in FIGS. 5 and 6. The pivot frame 4 is a tubular steel construction having two triangular end members 50, 51 with three cross members 52, 53, 54 extending therebetween. Each triangular end member includes a horizontal member 55, a vertical member 56, and diagonal member 57. Pivot frame clevis plates 37, 38 extend laterally from the top of the vertical member of each triangular end member, and are pivotably mounted in the base section pivot frame clevises 35, 36 using appropriate pins 58, 59, as shown in FIG. 7, to form the base section pivot point 5.

Two pivot frame container clevises 60, 61 extend vertically from the top of the horizontal members adjacent an end 100 of the horizontal member distal from the vertical member 56. The pivot frame container clevises receive container clevis plates 62, 63 (FIG. 8) mounted to the container 3 to form the container pivot point 6. Also, a pair of dump cylinder clevises 64, 65 extend laterally from the cross member 52 adjacent the ends thereof for mounting the dump cylinders 9, 10 between the base section cylinder clevises 39, 40 and the pivot frame. To provide a secure mounting position on the pivot frame for the tilt cylinders 7, 8, a pair of tilt cylinder devises 66, 67 are fixed to the cross member 53 with a support flange 68 extending therebetween.

Figure 7:
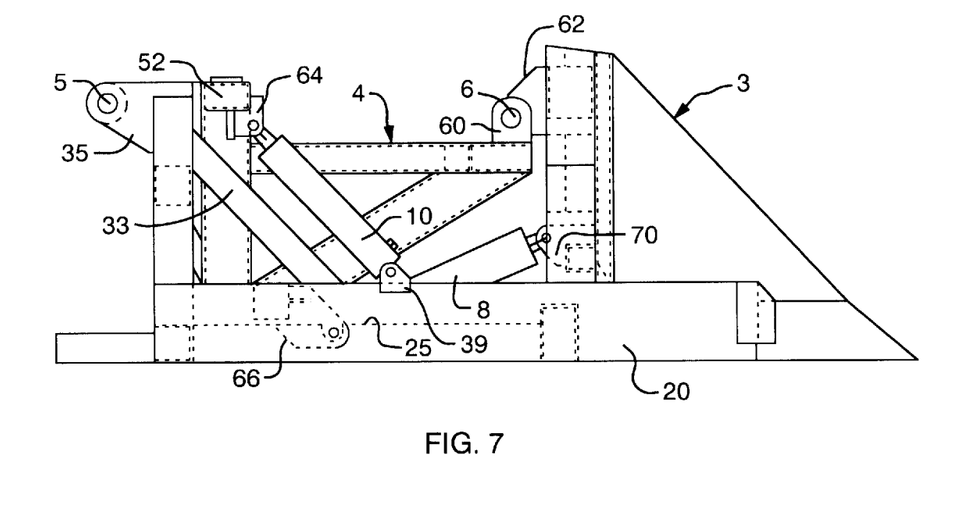
FIG. 7: is an side view of a portion of a material handler according to the present invention showing the interrelationship of the base section, the container, the pivot frame, and the hydraulic cylinders.
Figure 8:
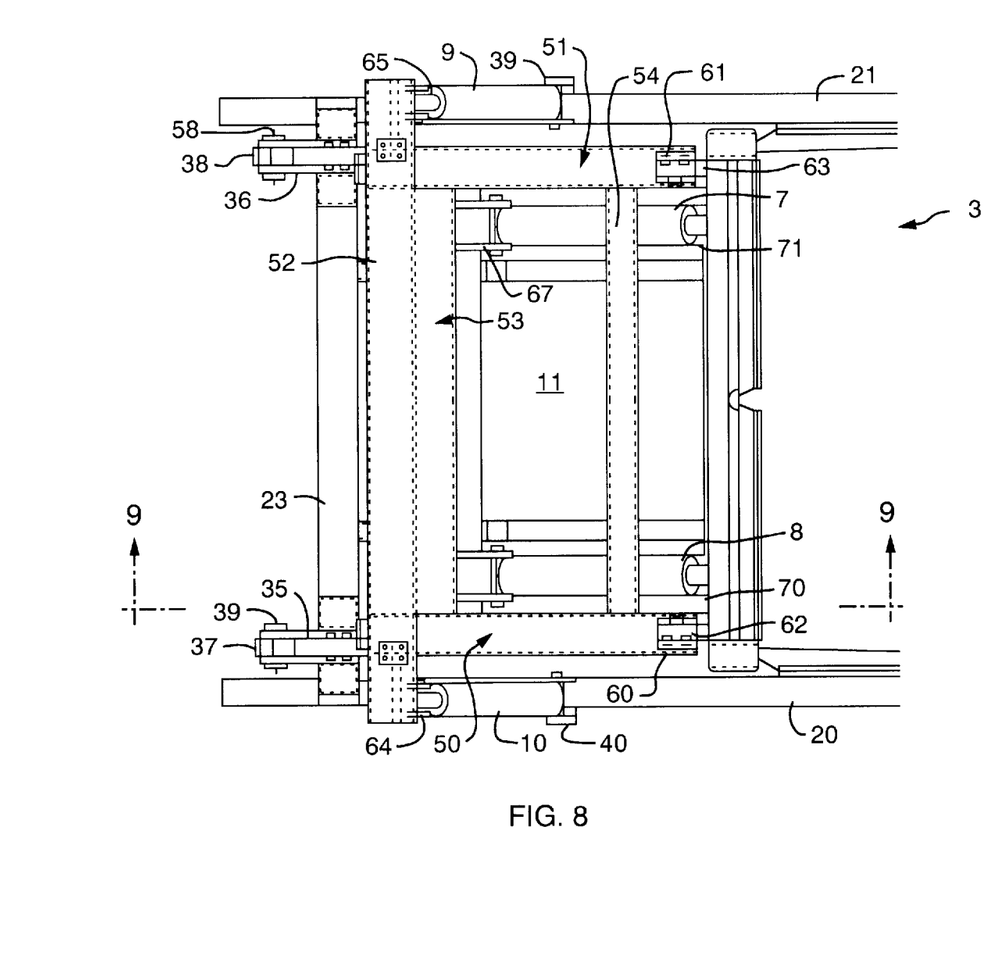
FIG. 8: is a top view of the of the material handler portion shown in FIG. 7.
Figure 9:
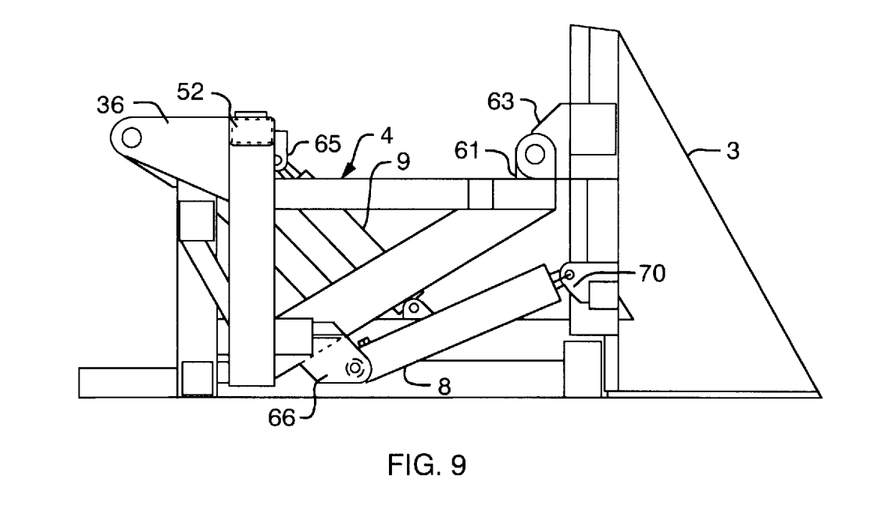
FIG. 9: is a sectional view of the material handler portion shown in FIG. 8 taken along lines VIII—VIII.

Detailed views of the interconnection of the base section, the pivot frame, the container, and the tilt and dump cylinders are provided in FIGS. 7–9. As shown, the pivotable connection between the container clevis plates 62, 63 and the pivot frame container clevises 60, 61 creates the pivot point 6 for rotation of the container 3 relative to the pivot frame 4. To rotate the container 3 into the horizontal position about the pivot point 6, the tilt cylinders 7, 8 are mounted between tilt cylinder clevises 70, 71 fixed to the container 3 and tilt cylinder devises 66, 67 on the pivot frame. The pivotable connection between the pivot frame clevis plates 37, 38 and the base section pivot frame devises 35, 36 creates the pivot point 5 for rotation of the pivot frame 4 relative to the base section 2. For rotating the pivot frame about the pivot point 5, the dump cylinders 9, 10 are mounted between the dump cylinder devises 39, 40 on the base section and the dump cylinder devises 64, 65 on the pivot frame.

Figure 10:
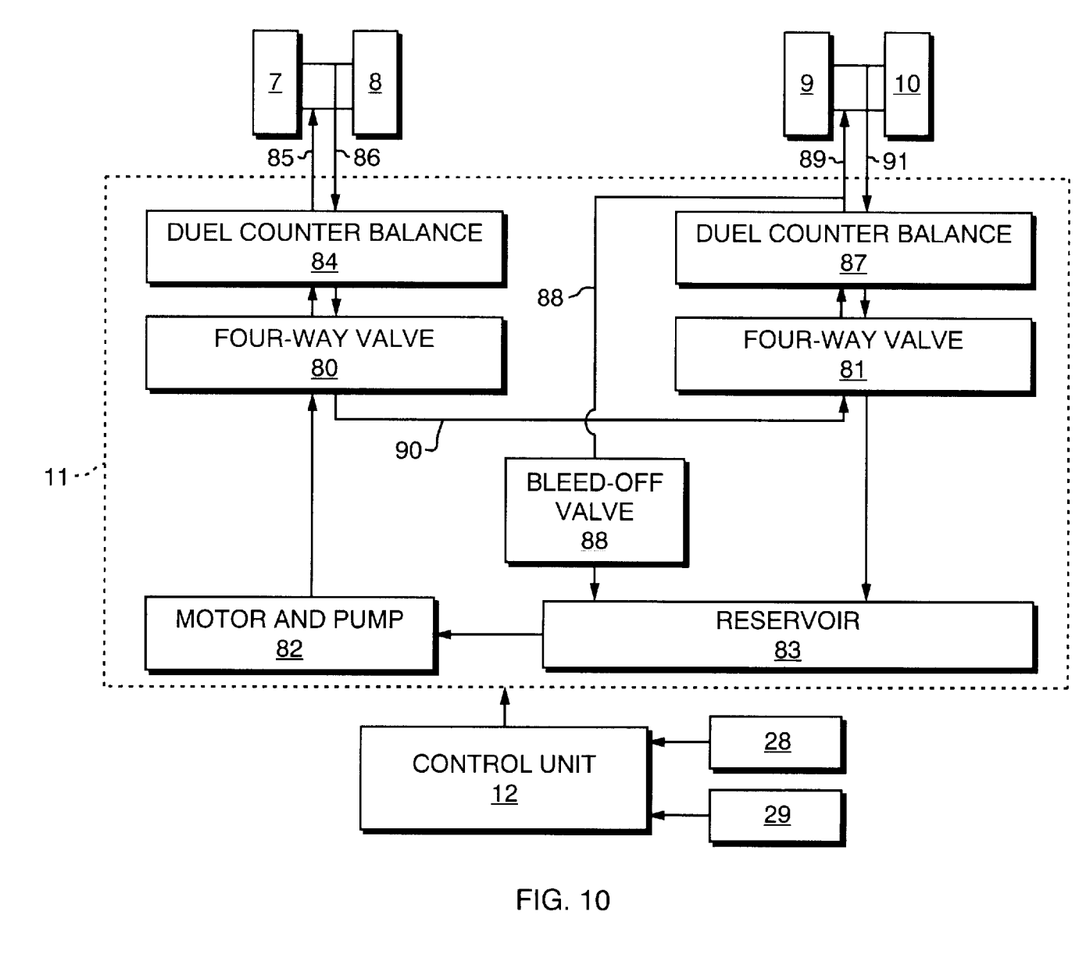
FIG. 10: is a block diagram of a preferred hydraulic circuit for a material handler according to the invention.

A block diagram of the preferred hydraulic circuit for actuating the tilt and dump cylinders is provided in FIG. 10. As shown, the hydraulic circuit includes: the tilt cylinders 7, 8; the dump cylinders, 9, 10; and the hydraulic power unit 11. The hydraulic control unit 12 provides for operator control of the hydraulic power unit 11 for initiating, halting, and controlling the dump cycle. To prevent injury, photo electric sensors 28, 29 in electrical communication with the control unit disable the power to system when an operator or equipment are in the area of the loading end of the container.

At the initiation of a dump cycle, the motor and pump 82 supplies hydraulic fluid from the reservoir 83 to the four-way valve 80. Fluid flow through the four-way valves 80, 81 is controlled by the control unit. To rotate the container into the horizontal position, fluid is passed through the four-way valve 80 to the tilt cylinders 7, 8 through a dual counter balance 84 and high pressure supply line 85. The dual counterbalance 84, as is known, provides appropriate back pressure in the high pressure supply 85 and return 86 lines for holding and releasing fluid pressure. Fluid flow to the tilt cylinders may be interrupted by the operator through the control unit, i.e. by operator controlled switches. If uninterrupted, flow to the container cylinders continues until a limit switch (not shown) is tripped when the container is rotated approximately 90° to a horizontal position, i.e. position II in FIG. 2.

Once the container reaches the horizontal position, flow to the dump cylinders 9, 10 is established by diversion of fluid from the four-way valve 80 through line 90 to the four-way valve 81. The four-way valve 81 supplies hydraulic fluid to the dump cylinders 9, 10 through a dual counterbalance 87 and high pressure line 89 to cause rotation about the pivot point 5. Again, the dual counterbalance provides sufficient back pressure in the supply 89 and return 91 lines for holding and releasing pressure. Flow to the dump cylinders 9, 10 may be interrupted by the operator to control the degree of rotation of the container. If uninterrupted, however, flow to the dump cylinders continues until a limit switch is tripped when the container rotates approximately 50° relative to its horizontal position, i.e. the full dump position III in FIG. 2.

At the completion of the dump cycle, hydraulic fluid supplied to the dump cylinders 9, 10 is returned to the reservoir 83, and the pivot frame rotates down to return the container to the horizontal position. When the horizontal position is reached, any pressure remaining in the high pressure supply line 89 is removed through a bleed off valve 88 to the reservoir. The container then returns to the home position with fluid from the cylinders 7, 8 returning to the reservoir through return line 86.

Thus, according to the present invention there is provided a dual pivot material handler which has a compact dumping motion with minimal container dump height variation. Advantageously, the design of the present invention provides these advantages in using direct acting hydraulic cylinders with no additional cams, linkage, etc. The design includes material container pivotably mounted at a container pivot point to a pivot frame. The pivot frame is pivotably mounted at a base section pivot point to a base section. In a dump cycle, the container is first rotated by hydraulic cylinders approximately 90° about the container pivot point to a horizontal position. In the horizontal position, the container is supported by the pivot frame. The dump cycle is completed by rotation of the pivot frame, with the container resting thereon, about the base section pivot point resulting in an approximately 50° rotation of the container to a full-dump position.

The embodiments which have been described herein are but some of the several which utilize this invention and are set forth here by way of illustration but not of limitation. For example, the pivot frame and base sections could take a variety of shapes and sizes while maintaining the advantages of the dual pivot design. Also, the arrangement of the various clevises and clevis plates could be modified in a variety of ways to achieve the relative orientations of the container, the pivot frame, and the base section. Moreover, it is possible to use any number of hydraulic cylinders in a variety of arrangements to rotate the container about the two pivot points. It is obvious that many other embodiments, which will be readily apparent to those skilled in the art, may be made without departing materially from the spirit and scope of this invention.

What is claimed is:

1. A dual pivot material handler for moving materials from a container to a predetermined location comprising:

a base section having first and second base section clevises extending therefrom;

a pivot frame having a first end pivotably mounted to said base section at a base section pivot point, first and second triangular end members spaced by at least one perpendicular support member, each of said triangular members including a horizontal member, a vertical member having upper and lower ends, and a diagonal member extending between the lower end of said vertical member and an end of said horizontal member;

first and second base section clevis plates, said first base section clevis plate being fixed adjacent a top of said vertical member of said first triangular end member, and said second base section clevis plate being fixed adjacent a top of said vertical member of said second triangular member;

said first and second base section devises being pivotably mounted relative to said first and second base section clevis plates respectively at said base section pivot point;

a container for receiving said materials, said container being pivotably mounted to a second end of said pivot frame at a container pivot point;

first and second container clevises, said first container clevis being fixed adjacent said end of said horizontal member of said first triangular member, said second container clevis being fixed adjacent said end of said horizontal member of said second triangular member;

said container further including a pair of container clevis plates extending therefrom, a first of said container clevis plates being pivotably mounted to said first container clevis, and a second of said container clevis plates being pivotably mounted to said second container clevis at said container pivot point;

at least one hydraulic tilt cylinder mounted between said pivot frame and said container for rotating said container about said container pivot point; and at least one hydraulic dump cylinder mounted between said pivot frame and said base section for rotating said pivot frame and said container about said base section pivot point;

means for first rotating said container about said container pivot point by said at least one tilt cylinder to a first position, and means for second rotating said container about said base section pivot point by said at least one dump cylinder to a second position to discharge said materials from said container.

2. A dual pivot material handler for moving materials from a container to a predetermined location as defined in claim 1 wherein said at least one hydraulic tilt cylinder is disposed between a tilt cylinder clevis mounted adjacent the lower end of the vertical member of said first triangular member and a tilt cylinder clevis mounted on said container.

3. A dual pivot material handler for moving materials from a container to a predetermined location as defined in claim 1 wherein said at least one hydraulic dump cylinder is disposed between a dump cylinder clevis mounted adjacent the upper end of the vertical member of said first triangular member and a dump cylinder clevis mounted on said base section.

* * * * *